United States Patent [19]

Nishimura

[11] Patent Number: 4,953,840

[45] Date of Patent: Sep. 4, 1990

[54] VICE JIG

[75] Inventor: Akira Nishimura, Kanazawa, Japan

[73] Assignee: Kabushiki Kaisha Nishimura Jig, Kanazawa, Japan

[21] Appl. No.: 404,570

[22] Filed: Sep. 8, 1989

[51] Int. Cl.[5] .............................................. B23Q 1/04

[52] U.S. Cl. .............................................. 269/282

[58] Field of Search .......................... 269/271, 277–284

[56] References Cited

U.S. PATENT DOCUMENTS

| | | | |
|---|---|---|---|
| 1,071,289 | 8/1913 | Bader | 269/280 |
| 2,643,563 | 6/1953 | Gavdreau | 269/280 |
| 3,502,319 | 3/1970 | Kuzolias | 269/280 |
| 4,383,682 | 5/1983 | Feinberg | 269/283 |
| 4,750,722 | 6/1988 | Chick | 269/282 |

*Primary Examiner*—Robert C. Watson
*Attorney, Agent, or Firm*—Oblon, Spivak, McClelland, Maier & Neustadt

[57] ABSTRACT

The present invention relates to a work holding vice jig to be attached to a jaw of a vice. According to the construction of this vice jig, grooves are formed in a work holding surface of the jig body so that works of special shapes, e.g. a round bar, can be clamped to the vice easily; further, a slide member which is slidable obliquely relative to the jig body is provided, and works of various thicknesses can be clamped to the vice efficiently by upward and downward sliding motions of the slide member.

11 Claims, 5 Drawing Sheets

VICE JIG

BACKGROUND ART

The present invention relates to a work holding jig for use in a mounted state to a vice.

According to the prior art, for clamping works of special shapes, e.g. a round bar, by means of a vice, there are separately produced specially-machined mouthpieces suitable for clamping such special-shape works, and only the mouthpiece portion is replaced.

Also, according to the prior art, when a thin work is to be clamped, a leveling stand is mounted on a vice and the work is put thereon and clamped. It is troublesome to separately produce the foregoing mouthpieces of special shapes, and it is also very troublesome and takes time to remove the mouthpiece already mounted and attach another mouthpiece. Besides, at every replacement of a mouthpiece a mounting error is apt to occur, often resulting in poor accuracy.

The operation using a leveling stand for clamping a thin work has also been very troublesome. For setting a thin work to an optimum height using a leveling stand, it has been necessary to perform a height adjusting operation with high accuracy. In the case of a rather thick work it has not been necessary to adjust the height so accurately, but as the work thickness becomes smaller, it is required to hold a large portion of the work by a mouthpiece and clamped completely, thus it has been necessary to make an accurate height adjustment to hold the work. In an actual operation, therefore, it is necessary to prepare several hundred kinds of leveling stands and select and use one having a suitable thickness. However, providing several hundred kinds of leveling stands troublesome in point of production and management, and the selection of a suitable one from among several hundred kinds is inefficient.

According to the prior art, moreover, when it is impossible to provide several hundred kinds of leveling stands, there is adopted a method wherein two or more are picked out from among a small number of kinds and select the most suitable one out of various combinations. In this case, however, it is troublesome and takes time to find out the most suitable combination.

In the case of using a leveling stand, moreover, the work positioning operation involves difficulty because the leveling stand moves. Besides, chip is apt to enter below the leveling stand, so it is necessary to make cleaning at every loading or unloading of a work, thus resulting in markedly deteriorated working efficiency.

SUMMARY OF THE INVENTION

It is an object of the present invention to provide a work holding jig capable of easily clamping works of special shapes, e.g. a round bar, to a vice.

It is another object of the present invention to provide a work holding jig capable of clamping a work of any thickness easily and accurately even without providing many kinds of leveling stands in advance.

It is a further object of the present invention to provide a vice jig capable of clamping works of special shapes at desired vertical positions.

DETAILED DESCRIPTION OF THE INVENTION

The construction of the present invention will be described hereinunder with reference to the drawings which illustrate typical embodiments of the invention.

Figure 1:
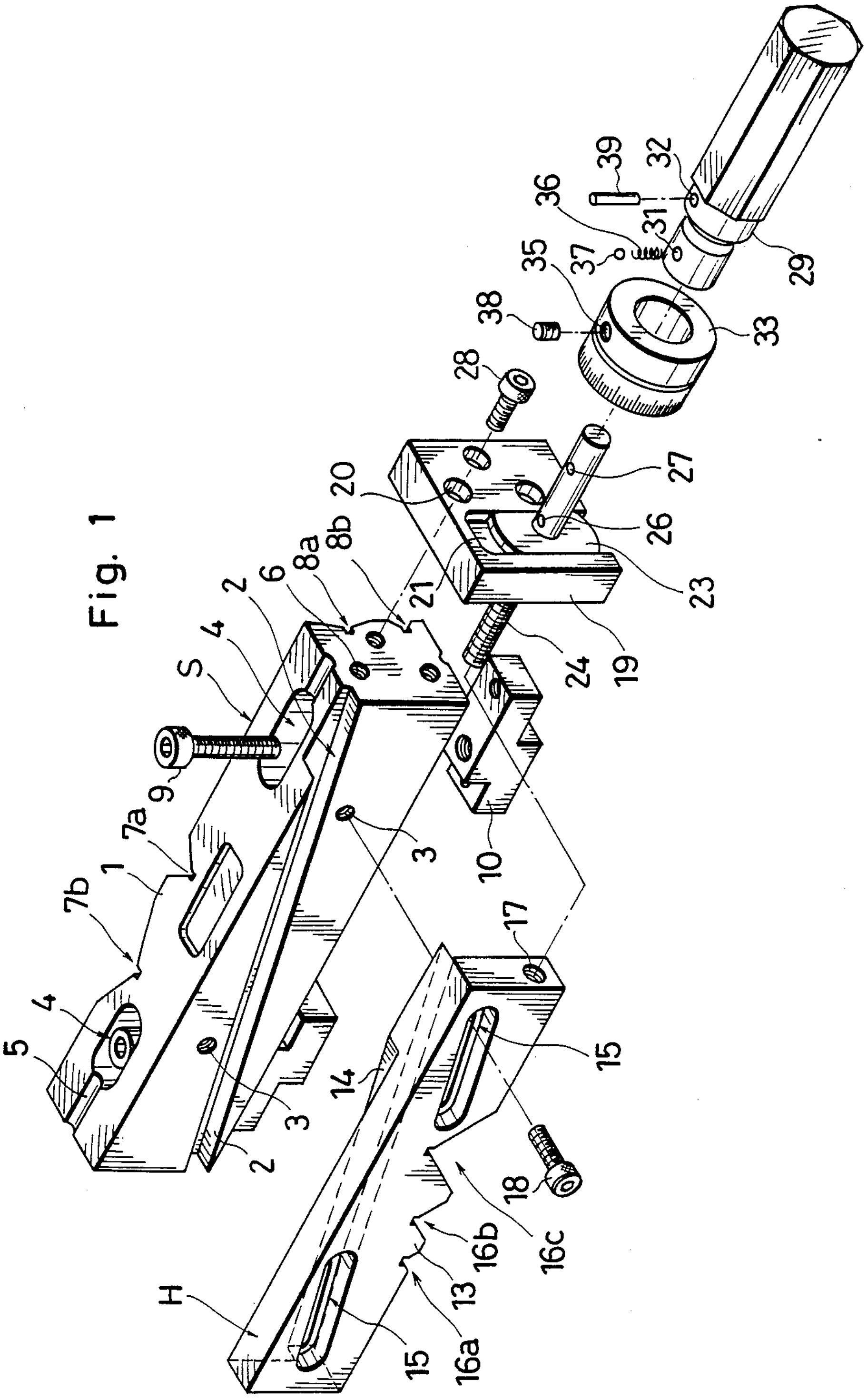
FIG. 1 is an exploded explanatory view showing a typical embodiment of the present invention.
Figure 2:
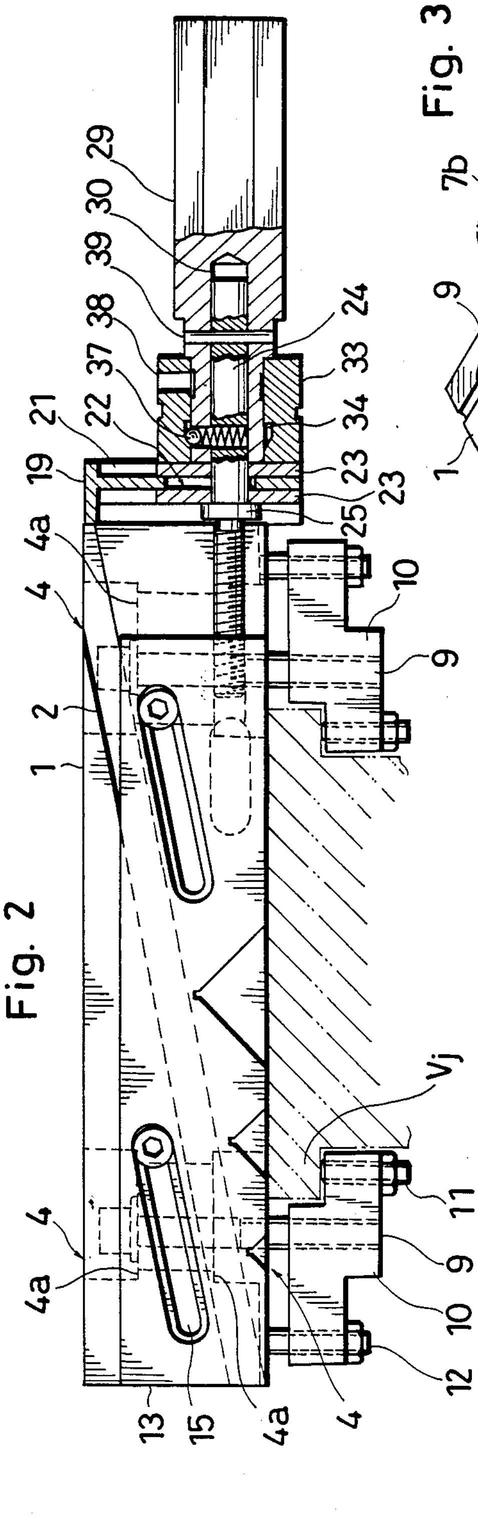
FIG. 2 is a partially cut-away explanatory view showing an example of mounting of the jig illustrated in FIG. 1.
Figure 3:
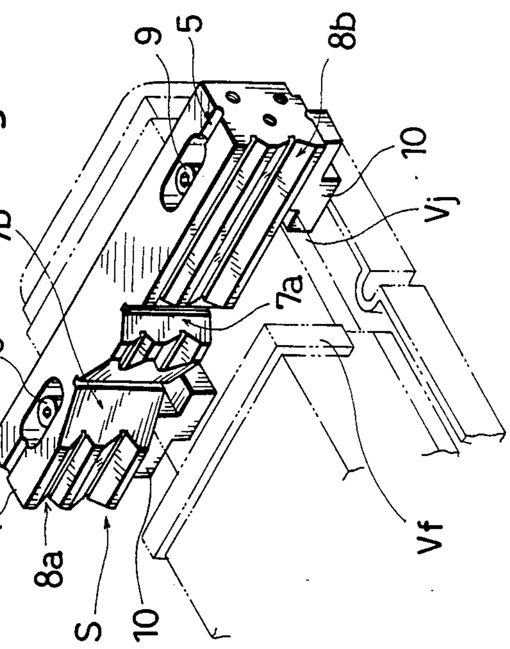
FIG. 3 is an explanatory perspective view showing an example of mounting of the jig illustrated in FIG.1.

The work holding jig illustrated in FIG. 1 comprises, as basic members, a body 1 and a pair of fixing pieces 10, 10. A pair of vertically extending through holes 4, 4 are formed in the body 1, and seat portions *4a*, *4a* for retaining bolt heads are formed at suitable positions in the vertical direction of the through holes 4, 4 (see FIG. 2). And a work holding surface S for holding a work of a special shape is formed on one side of the body 1 parallel to the through holes 4. More specifically, as shown in FIG. 3, on the work holding surface S there are formed V-shaped grooves *8a*, *8b*, of different angles extending in the longitudinal direction of the body 1 and also formed V-shaped grooves *7a*, *7b*, extending in the direction in which they intersect the longitudinal V grooves *8a*, *8b* perpendicularly. For example, for clamping a work of a special shape, e.g. a work having a circular section, part of the peripheral surface of the work is brought into engagement with any of the V grooves *7a*, *7b*, *8a*, *8b* and in this state the work is clamped to the vice.

The fixing pieces 10, 10 are threadedly engaged with the tip ends of bolts 9, 9 which are inserted into the through holes 4, 4. Each fixing piece 10 is formed in the shape of a Z and one end thereof is brought into abutment with the underside of a stepped portion of a stationary jaw Vj of the vice, as shown in FIG. 2. Then, by tightening the bolts 9 the body 1 is fixed to the stationary jaw Vj, whereby the body 1 is mounted to the stationary jaw Vj as shown in FIG. 3, and a work of a special shape such as a round bar can be clamped firmly between the mouthpiece of a movable jaw Vf and the work holding surface S. Each through hole 4 is formed so as to be long in the longitudinal direction of the holding surface S, thereby permitting movement of the body 1 or mounting thereof to vices of different sizes. As shown in FIG. 2, moreover, a bolt 11 is inserted through each fixing piece 10 below the stepped portion of the stationary jaw Vj to prevent the fixing piece 10 from being deformed or crushed and prevent lowering in accuracy of the jig.

On the other end side of the fixing piece 10 a bolt 12 extends in the thickness direction through the fixing piece and the tip end thereof is fitted in a slot 5 formed in the body 1 to prevent displacement of the body 1 and the fixing piece 10 from their mounted positions.

Figure 4:
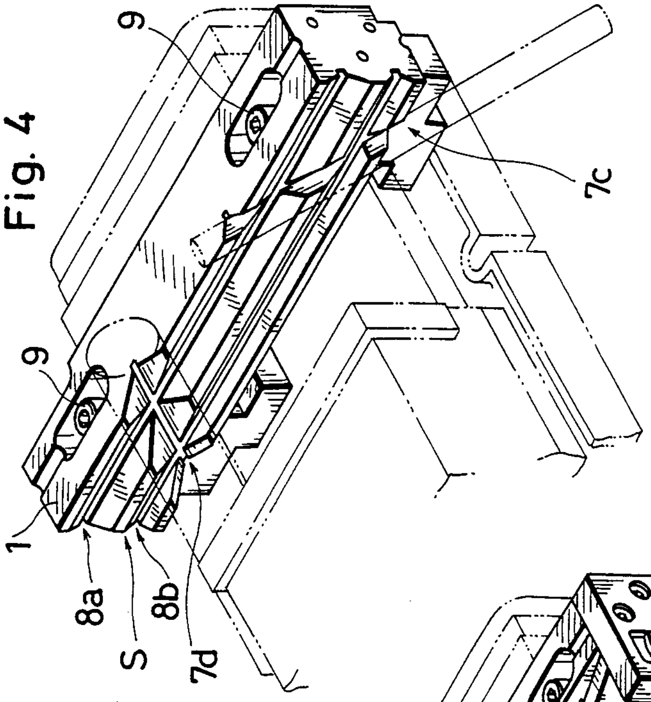
FIG. 4 is an explanatory perspective view corresponding to FIG. 3, showing another embodiment of the present invention.

The opening angle of the V-shaped grooves *7a, 8a* and that of *7b, 8b* are set at 90° and 140° , respectively. V grooves may be formed in the work holding surface S so as to be inclined 45° relative to the V grooves *8a, 8b,* like V grooves *7c, 7d* shown in FIG. 4, to facilitate machining of a work at 45 degrees. Such inclination may be set at a desired angle.

On the other hand, as shown in FIG. 1, on the surface of the body 1 opposite to the work holding surface S there are formed an inclined guide slot 2 and two threaded holes 3, 3. Separately, there is provided a slide member 13 having a rib 14 for fitting in the guide slot 2. The slide member 13 is a little smaller in both height and width than the body 1. In two right and left positions of the slide member 13 there are formed elongated through holes 15 at the same angle of inclination as that of the rib 14, the holes 15 extending through the slide member 13 from the front to the back side. Further, in the underside of the slide member 13 there are formed V-shaped recesses *16a, 16b* and *16c* side by side, while the upper surface thereof forms a flat work resting surface H. Thus, when the jig is disposed with the resting surface H facing upwards, as shown in FIG. 1, the slide member 13 is moved to a desired position vertically along the guide slot 2 and bolts 18 are tightened in that position, whereby the slide member 13 can be fixed to the body 1.

Further, threaded holes 6 are formed in a side face of the body 1 which perpendicularly intersects the surface of the body 1 where the guide slot 2 is formed. And there is provided a holding piece 19 of a square shape for attachment to the side face. The holding piece 19 has three through holes 20 in the positions corresponding to the threaded holes 6, and concave portions 21 are formed in the surface and the back respectively of the holding piece, with a through hole 22 being formed centrally through the concave portions 21 (see FIG. 2). Further, elliptical dust-proof plates 23 a little larger than the through hole 22 are in close contact with the holding piece 19 within the concave portions 21 respectively. Circular holes are formed centrally in the dust-proof plates 23 respectively and a rotary shaft 24 is inserted through those circular holes. A front end portion of the rotary shaft 24 on the slide member 13 side is externally threaded and a collar 25 is integrally formed on a nearly central part of the shaft, the collar 25 being in abutment with one of the dust-proof plates 23. On the side opposite to the external threads of the rotary shaft 24 there are formed through holes 26 and 27 in spaced relation to each other.

The holding piece 19 is brought into contact with the side face of the body 1 and the threaded holes 6 of the body 1 and the through holes 20 of the holding piece 19 are aligned with each other, thereafter the bolts 28 are inserted from the through holes 20 and threaded into the threaded holes 6 to fix the holding piece 19 to the body 1. Then, the rib 14 of the slide member 13 is fitted in the guide slot 2, and the slide member 13 is slid until a threaded hole 17 thereof is aligned with the front end of the rotary shaft 24, whereupon the rotary shaft is rotated and threadedly engaged with the threaded hole 17.

Further, a cylindrical handle 29 is connected to the opposite end side of the rotary shaft 24. The slide member 13 side of the handle 29 is partially reduced in diameter and a hole 30 is formed axially in that reduced-diameter portion (see FIG. 2). Near the middle of the reduced-diameter portion there is formed a hole 31 in a direction of intersecting the hole 30, while another through hole 32 is formed in the handle 29. Moreover, there is provided a graduated cylinder 33 having a through hole for fitting therein of the above reduced-diameter portion of the handle 29. And the reduced-diameter portion is inserted into the cylinder 33. In the inner peripheral surface of the cylinder 33 there is formed a circumferential groove 34 which is deeper on the handle 29 side, and further formed is an internally threaded hole 35 extending radially through the cylinder.

Figure 10:
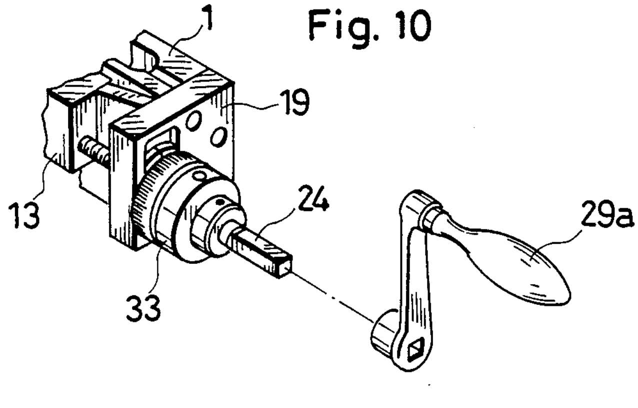
FIG. 10 is an explanatory perspective view showing another example of a rotary shaft end.

A coil spring 36 is fitted in the through hole 26 of the rotary shaft 24, then a ball 37 is put on the coil spring 36 and pushed into the through hole 26. In this state the rotary shaft 24 is pushed into the hole 30 of the handle 29. Upon alignment of the through hole 26 of the rotary shaft 24 with the hole 31 of the handle 29, the coil spring 36 jumps out into the hole 31, so that the ball 37 is fitted in the circumferential groove 34 and pushes the slant face of the groove 34, whereby the cylinder 33 is pushed against the dust-proof plate 23. Then, a set-screw 38 is threaded into the hole 35 of the cylinder 33 to fix the latter to the handle 29. Lastly, a pin 39 is inserted from the through hole 32 of the handle 29 into the through hole 27 of the rotary shaft 24. Assembling of the whole is now over. In place of the linear handle 29 shown in FIG. 1, such a crank-like handle *29a* as shown in FIG. 10 may be attached removably to the rotary shaft 24 to rotate the shaft quickly.

Figure 5:
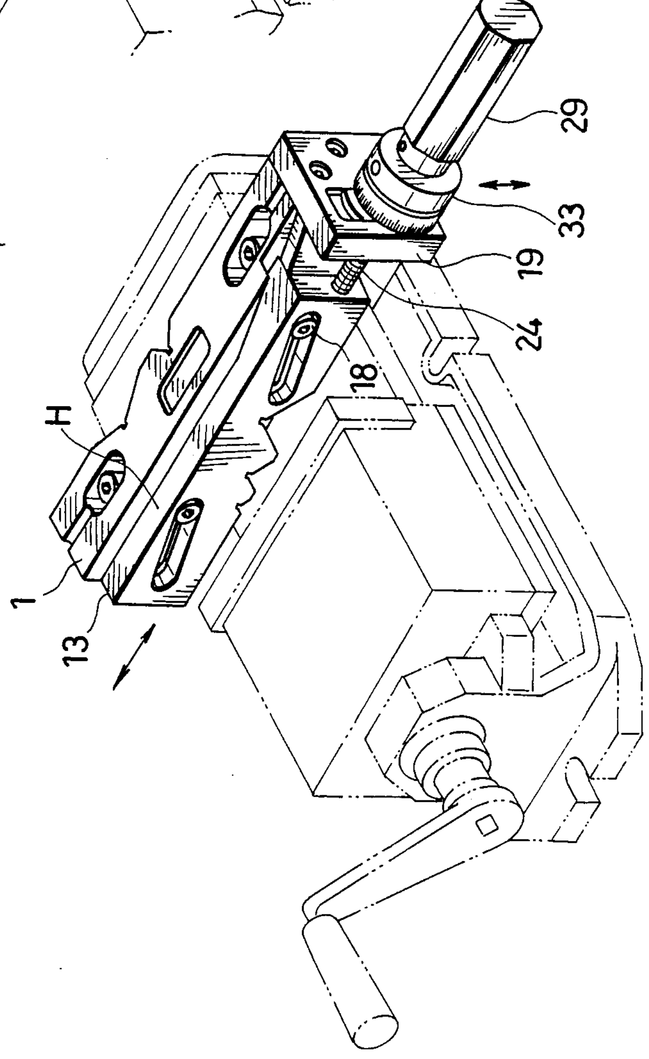
FIG. 5 is an explanatory perspective view corresponding to FIG. 2, showing another example of mounting of the jig illustrated in FIG. 1.

In mounting the jig described above to a vice, the body 1 is pushed firmly against the mouthpiece of stationary jaw Vj, as shown in FIG. 2. Then, while the bolts 9 are moved right and left within the right and left through holes 4, the bolts 11 at the inner ends of the two fixing pieces 10 are positioned on the stepped jaw portions of the vice, and the bolts 9 are tightened. At this time, the upper ends of the outside bolts 12 are engaged in the grooves 5 of the body 1 to prevent lateral displacement of the fixing pieces 10. Upon completion of this tightening operation, the body 1 is mounted firmly to the vice, assuming the state shown in FIG. 5. In this case, it is desirable to select a mouthpiece so that the upper surface of the body 1 and that of the mouthpiece of the vice are flush with each other. The accuracy of the inner surface of the mouthpiece shifts to the front face of the body 1 and that of the upper surface of the vice shifts to the resting surface H of the slide member 13.

Now, a work is put onto the resting surface H of the slide member 13 and clamped. But before this clamping operation, the height of the slide member 13 is adjusted according to the thickness of the work. More specifically, if the work is thick, the height of the slide member 13 is made low, while as the work becomes thinner, the slide member 13 is made higher. The height of the slide member 13 is adjusted while looking at the graduation on the cylinder 33. More particularly, with rotation of the handle 29, the rotary shaft 24 also rotates to push or pull the slide member 13. When the slide member 13 is pushed, the rib 14 is moved downwards along the guide slot 2, while if it is pulled, the rib 14 can be moved upwards. Therefore, when an optimum height is reached according to the thickness of the work, the turning of the handle 29 is stopped and the bolts 18 are tightened firmly to fix the slide member 13. Then, the vice is tightened to clamp the work firmly. With rise and fall of the slide member 13, there arises the necessity of rise and fall of the rotary shaft 24, but this rising and falling motion can be followed by sliding movements of the dust-proof plates 23, 23 relative to the holding piece 19 on the stationary side.

Figure 6:
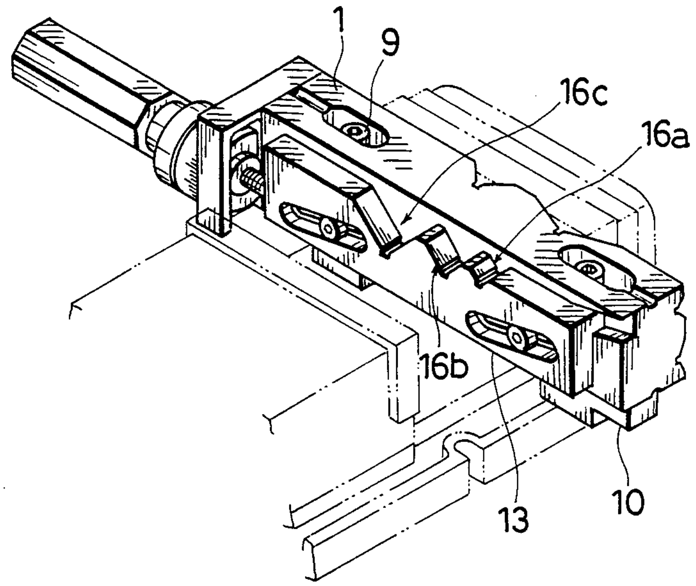
FIG. 6 is an explanatory perspective view showing a further example of mounting of the jig illustrated in FIG. 1.

In using this jig, the body 1 may be turned upside down, as shown in FIG. 6. More specifically, if the bolts 9 are once loosened and the entire body 1 is removed from the vice, thereafter the bolts 9 and the fixing pieces 10 are removed and turned upside down, the jig is also turned upside down, then attached to the vice, there is obtained such a state as shown in FIG. 6. And after adjusting the height by moving the slide member 13 up and down, a work, e.g. a round bar, is clamped so as to intersect the mouthpiece perpendicularly.

Figure 7:
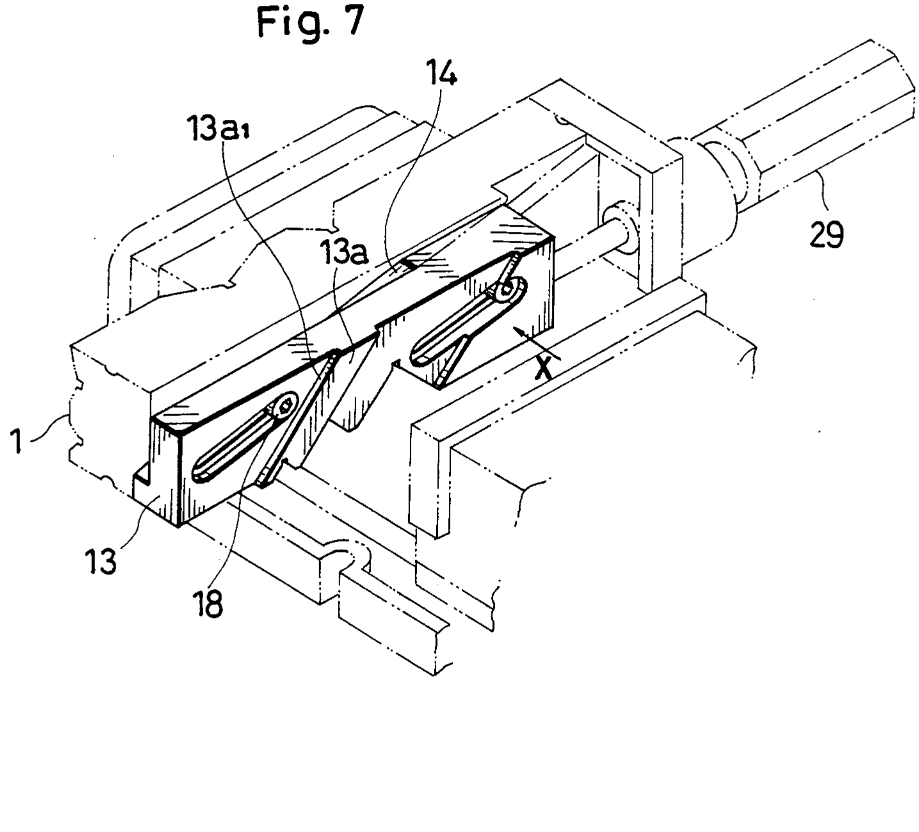
FIG. 7 is an explanatory perspective view showing another example of a slide rest.
Figure 8:
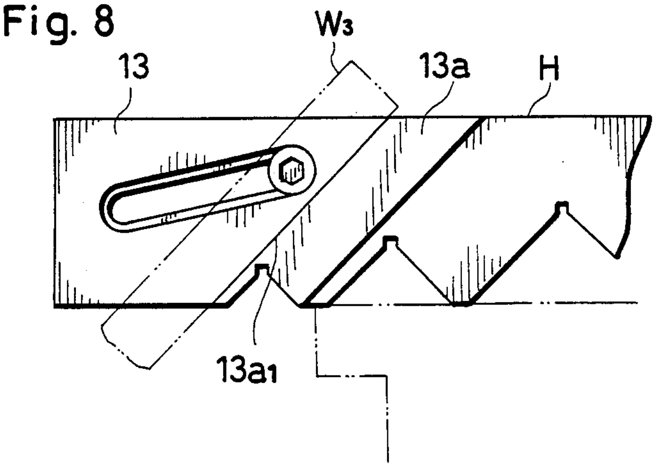
FIGS. 8 and 9 are each a partially cut-away side view exemplifying in what manner the slide rest illustrated in FIG. 7 is used.
Figure 9:
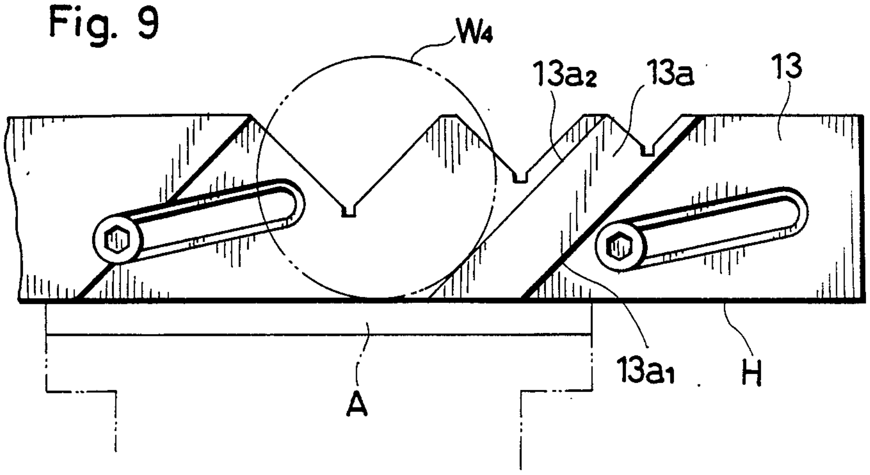

FIG. 7 illustrates another slide member 13 according to the present invention, in which a band-like projection 13*a* inclined at an angle of 45 degrees is formed on the side opposite to the side where a rib 14 is formed. More specifically, as shown in FIG. 8, a work $W_3$ is set along an outside end face $13a_1$ of the projection 13*a* so that the work can be subjected to an oblique machining at an angle of 45 degrees. Further, the slide member 13 is turned upside down; then, as shown in FIG. 9, using a leveling stand A, a work $W_4$ having a large diameter and a small width is positioned and clamped by utilizing an inside end face $13a_2$ of the projection 13*a*.

In the work holding jig of the present invention, the body 1 is fixed to a vice by contacting the right and left fixing pieces 10 with the underside of the vice jaw and then tightening the bolts 9, and thus the mounting of the jig to the vice can be done easily. Also, it can be removed easily by merely loosening the bolts 9.

In the case of the body 1 alone, a work of a special shape such as a round bar can be firmly supported and clamped by utilizing a V-shaped groove formed in the work holding surface. Thus, it is not necessary to make replacement with a specially-produced mouthpiece, so the conventional troublesome operation is not needed and hence the working efficiency is improved remarkably.

Where the slide member 13 is used, since its height can be adjusted in a stepless manner, it is possible to hold a work at an optimum height matching the thickness of the work and clamp it to a vice.

What is claimed is:

1. A work holding vice jig to be removably attached to a jaw of a vice, wherein said jig comprises a body and a pair of fixing pieces, said body having a pair of parallel through holes and also having one side face thereof parallel to said through holes which one side face serves as a work holding face having grooves for holding works of special shapes, said fixing pieces being threadedly engaged with the tip ends of bolts inserted through said through holes; wherein an inclined guide slot is formed in a side face opposite to the side face serving as the work holding face of said body; a slide member having a rib adapted to be fitted in said guide slot and also having a horizontal work resting surface is provided; a pair of threaded holes are formed in the vicinity of said guide slot; and elongated through holes for the mounting of bolts are formed in said slide member in positions corresponding to said threaded holes.

2. A vice jig according to claim 1, wherein a holding piece is attached to one side face which intersects the work holding face of said body perpendicularly; a rotary shaft having a threaded portion formed on one end thereof is supported by said holding piece rotatably and vertically movably; and a threaded hole for threaded engagement with the front end of said rotary shaft is formed in a side portion of said slide member.

3. A vice jig according to claim 2, wherein a rotary handle is attached to the end portion opposite to said one threaded end of said rotary shaft, and a graduated cylinder is mounted on said handle.

4. A vice jig according to Claim 1, wherein in said work holding face there are formed a V-shaped groove extending in the horizontal direction and a V-shaped groove extending in the vertical direction perpendicularly to said horizontal V-shaped groove.

5. A vice jig according to Claim 1, wherein in said work holding face there are formed a V-shaped groove extending in the horizontal direction and a V-shaped groove having an inclination of 45 degrees relative to said horizontal V-shaped groove.

6. A vice jig according to Claim 1, wherein said through holes are formed as long holes elongated in the longitudinal direction of said body, and seat portions for retaining bolt heads are formed at suitable positions in the vertical direction of said through holes.

7. A vice jig according to claim 1, wherein said fixing pieces are formed in the shape of a Z, having threaded holes extending in the thickness direction through both end portions, with bolts being threadedly engaged with said threaded holes respectively.

8. A vice jig according to claim 1, wherein said bolt mounting through holes are formed as long holes parallel to said guide slot, and seat portions for retaining bolt heads are formed at suitable positions in the piercing direction of the holes.

9. A vice jig according to claim 1, wherein said slide member has a linear projection having an inclination of 45 degrees relative to the work resting surface of the slide member, said linear projection being formed on the side face opposite to the side face where the rib is formed of the slide member.

10. A vice jig according to claim 3, wherein said rotary handle is formed in the shape of a crank.

11. A vice jig according to claim 1, wherein said slide member has a V-shaped recess formed on the side opposite to said work resting surface.

* * * * *